United States Patent [19]

Flagg

[11] 4,258,697
[45] Mar. 31, 1981

[54] PNEUMATIC COLLECTION, STORAGE AND TRANSFER OF SOLAR HEAT

[76] Inventor: Rodger H. Flagg, 1415 Lynn Ave., Fort Wayne, Ind. 46805

[21] Appl. No.: 20,795

[22] Filed: Mar. 15, 1979

[51] Int. Cl.³ .............................................. F24J 3/02
[52] U.S. Cl. .................................... 126/430; 126/400; 126/436; 126/438; 126/450
[58] Field of Search ............... 126/426, 430, 436, 450, 126/449, 438, 444; 165/104 M, 104 S

[56] References Cited

U.S. PATENT DOCUMENTS

| | | | |
|---|---|---|---|
| 2,907,318 | 10/1959 | Awot | 126/438 |
| 3,987,786 | 10/1976 | Keyes et al. | 126/400 |
| 3,997,108 | 12/1976 | Mason | 126/422 |
| 4,061,267 | 12/1977 | Lof | 126/419 |
| 4,086,909 | 5/1978 | Lyon | 126/432 |
| 4,088,266 | 5/1978 | Keyes | 126/430 |
| 4,129,116 | 12/1978 | Kent | 126/429 |
| 4,151,830 | 5/1979 | Crombie | 126/450 |
| 4,160,443 | 7/1979 | Brindle et al. | 126/426 |
| 4,182,307 | 1/1980 | Brindle et al. | 126/426 |

Primary Examiner—James C. Yeung

Attorney, Agent, or Firm—Rodger H. Flagg

[57] ABSTRACT

The collection, storage and transfer of solar heat by pneumatic means includes: a solar collection system; a heat storage system; and a means for selectively directing air through the solar collector, the heat storage, and the point of use. The solar collection system includes a first chamber of convex, curvilinear shape covered with a light-transmissive material, and positioned to receive sunlight. A series of second chambers is formed beneath the first chamber by light-transmissive material located above and below a series of inclined ducts through which air from the first chamber is directed. Each duct receives air from the upper portion of the preceding secondary chamber and redirects the air into the lower portion of the next succeeding secondary chamber. After passing through the entire series of secondary chambers, the heated air is directed into a third concave, curvilinear-shaped chamber located beneath the series of second chambers. The concave, curvilinear surface is made reflective so that sunlight passing through all three chambers strikes the reflective surface and is redirected back through the three chambers to additionally heat the air therein.

16 Claims, 11 Drawing Figures

PNEUMATIC COLLECTION, STORAGE AND TRANSFER OF SOLAR HEAT

BACKGROUND OF THE INVENTION

Numerous attempts have been made to invent a dependable, reliable and economic system for collecting and storing the sun's heat. These systems can be broken down into two major types: passive and active systems.

Passive systems function without the use of external energy. While these systems have the advantage of not requiring an external energy supply, they are inferior to active systems with regard to their capacity to convert sunlight to heat, and to adequately store and transfer the heat as it is needed at the point of use.

Active systems for the collection of heat from sunlight can be divided into two major types: liquid systems, and pneumatic systems.

Liquid systems have the advantage of obtaining slightly greater conversion rates of heat from solar energy. However, liquid systems require greater investments in terms of apparatus and maintenance. They must be protected against freezing in colder climates. A leak in a liquid system can inactivate the entire system, and may flood the surrounding area.

Pneumatic systems, of which this invention is one, have several major advantages: the apparatus may be simple, easily manufactured and assembled, and provide reasonably high conversion of sunlight to heat. A leak in a pneumatic system, while reducing efficiency, neither damages the surrounding environment nor requires the system to shut down.

SUMMARY OF THE INVENTION

The solar collection system has a convex, curvilinear shape positioned to receive sunlight, a horizontal base and a vertical rear support. The convex, curvilinear shape is covered with a light-transmissive material. A series of elongated diagonal ducts are positioned between the top of the rear vertical support and the front of the horizontal base support.

A first chamber is formed between the outer, light-transmissive sheet and a second light-transmissive sheet located on the upper surface of the series of ducts. A third light-transmissive sheet is located beneath the ducts, forming a series of secondary chambers. Within each duct is an inlet located near the top and an outlet located near the bottom on the opposite side of the duct.

A concave, curvilinear, reflective surface forms a third chamber beneath the series of secondary chambers. This chamber redirects the air passing from the series of secondary chambers across the entire length of the solar collector into the heat storage media, or to the point of use.

Heat storage is located in proximity to the solar collection system, either beneath or behind the solar collector.

Sectioned bags may be filled with particulate insulating material and used to insulate the heat storage system.

A single air pump has been adapted to selectively route air from the heat storage to the solar collector; from the point of use to the heat storage; or from the point of use to the solar collector. The flow of air through the heat storage medium is reversed, so that air traveling from the collector into the heat storage medium travels in opposite directions to air directed from the point of use into the heat storage medium. Two individually controlled gate valves serve to selectively route the air through the system.

Other objects and advantages of this invention will become more apparent when viewed in light of the accompanying specification and drawings.

OBJECTS OF THE INVENTION

One object of the present invention is to provide a new and improved method and apparatus for the pneumatic collection, storage and transmission of heat generated from sunlight.

It is also an object of this invention to provide a compact, self-contained solar heating system which can be installed externally to a new or existing building to provide heat from the sun to a point of use within the building.

It is another object of this invention to provide a low profile, solar collection system which may be located exteriorly of a greenhouse, and provide for heat collection from the sun during the day while the greenhouse is also heated by the sun; and provide additional heat to the greenhouse from the heat storage media at night, when the greenhouse is not collecting heat from the sun.

It is another object of the present invention to provide three chambers through which the air must travel, which serves to buffer the increasingly heated air from the atmosphere and provide three times the quantity of air exposed to sunlight in a given collector area.

It is a further object of this invention to provide for increased storage capacity of the heat from the solar collector, so that the heat may be stored during daylight and used when the sun is no longer shining.

It is a further object of this invention to provide a readily assembled solar collector system in kit form which may be readily installed next to a new or existing building.

It is a further object of this invention to direct the air from the solar collector to the heat storage or the point of use through a single blower in such a way that the air travels through the heat storage apparatus in opposite directions.

It is a further object of this invention to utilize bulk materials (from local sources) while providing other materials in kit form, to reduce the costs of transportation and minimize costs.

These and other objects of this invention will become apparent to a person skilled in the art as that person reads the following drawings, specifications and claims.

DETAILED DESCRIPTION OF THE INVENTION

Figures 1, 2:
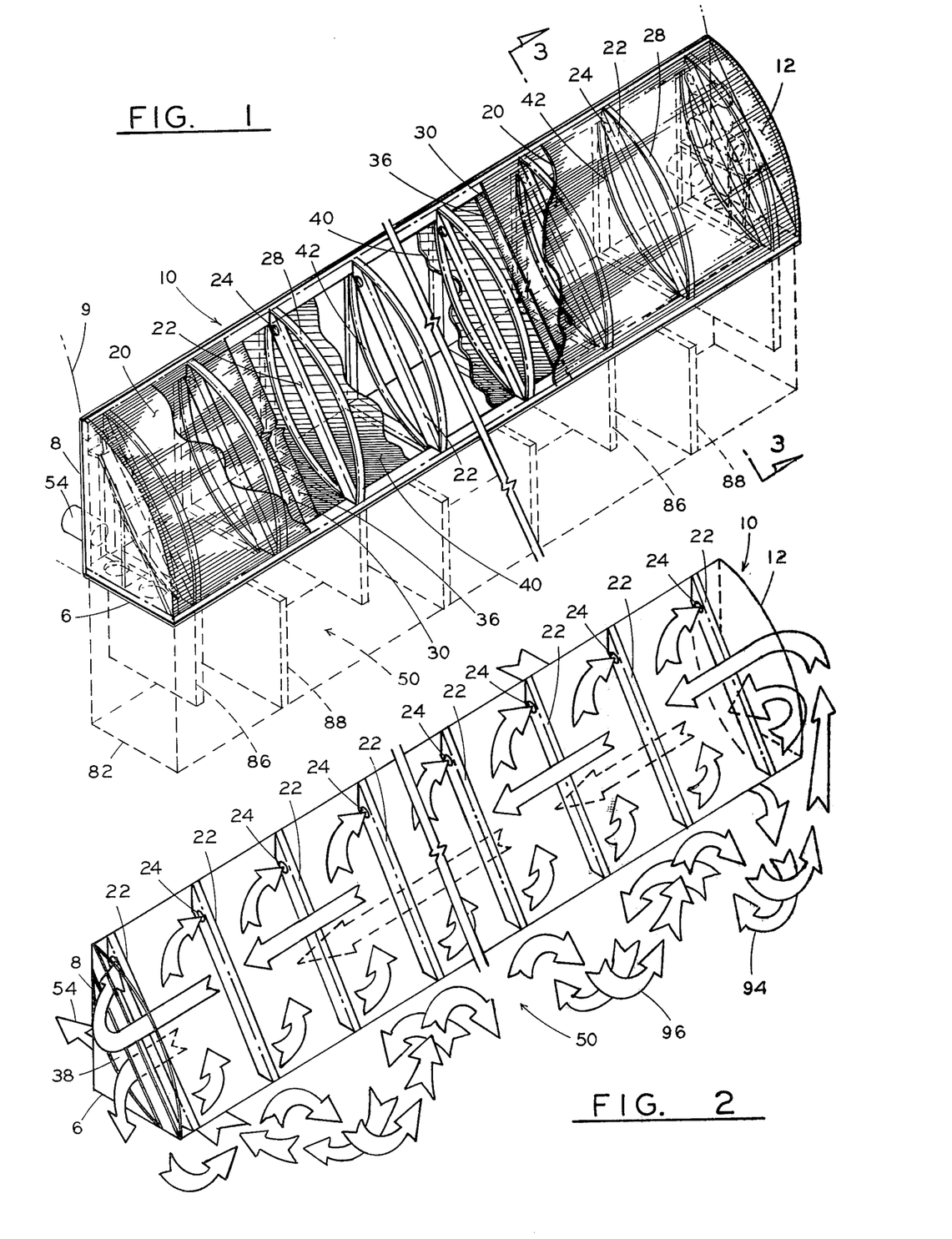
FIG. 1 is a perspective view of the solar collection system showing the three chambers sectioned for ease of presentation, with the heat storage system located beneath the solar collection system.
FIG. 2 is a schematic view of the air flow within the solar collection system showing the routing of air through all three chambers and heat storage as well as to-and-from the point of use.
Figure 3:
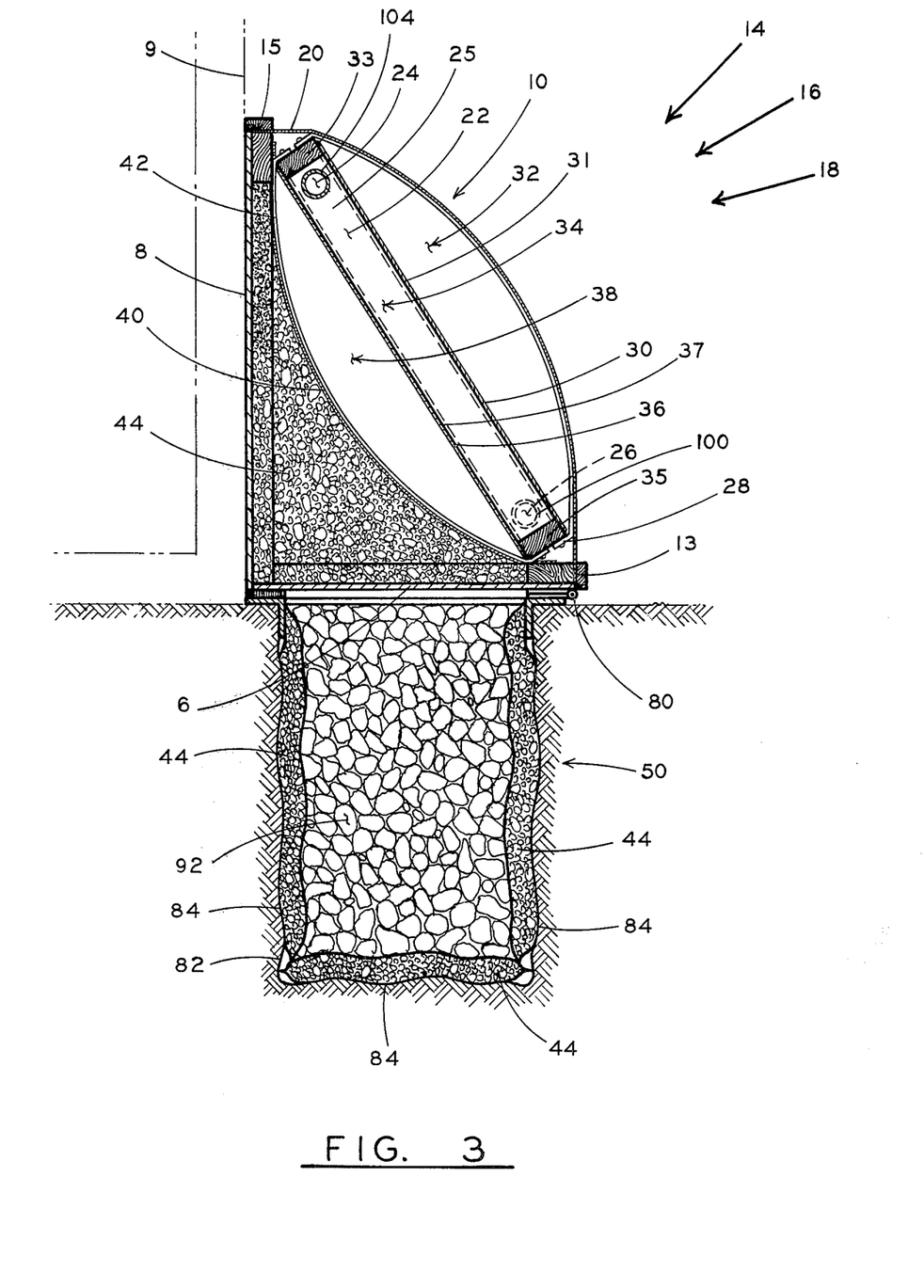
FIG. 3 is a cross sectional view taken through lines 3—3 in FIG. 1 which shows a cross sectional view of the solar collection system and heat storage where the heat storage system is located beneath ground.

Referring to FIGS. 1-3, the solar collection system 10, comprises a horizontal base 6, a rear vertical support 8, and a convex, curvilinear outer surface 12, positioned to receive sunlight.

The angle of inclination of sunlight varies with the seasons, and the time of day, as shown by arrows 14,16,18, in FIG. 3. The outer convex, curvilinear surface 12, presents a large portion of the solar collection surface in approximate perpendicularity to the available sunlight, regardless of its angle of inclination, eliminating the need to track the sun, or to provide different angular positions of the collector surface in different latitudes.

The curvilinear shape 12 also serves to improve the strength characteristics of the outer light transmissive sheet 20, with regard to load distribution from prevailing weather, such as wind, rain, sleet, and snow.

Spanning from the upper portion of the rear vertical support 8 to the forward portion of the horizontal base 6, are a series of elongated diagonal ducts 22. Each diagonal duct 22, has an inlet opening 24 on one side 25, near the upper portion of the rear vertical support 8, and an outlet opening 26, in the opposite side 27, near the forward portion of the horizontal base 6.

In the preferred embodiment, a series of convex ribs 28 span from the upper portion of the rear vertical support 8 to the forward portion of the horizontal base 6. The convex ribs 28, serve to support the outer light transmissive sheet 20, in a convex, curvilinear shape 12.

A second light transmissive sheet 30 is adapted to be secured to the upper portion 31 of this series of diagonal ducts 22; forming a first chamber 32 between the convex, curvilinear light transmissive sheet 20, and a second light transmissive sheet 30, secured to the upper portion of the diagonal ducts 22.

A series of second chambers 34, are formed between the series of diagonal ducts 22, by a third light transmissive sheet 36 adapted to be secured to the lower portion 37 of the series of diagonal ducts 22.

The light transmissive sheets 30,36 may be secured to the diagonal ducts by adhesive tape, glue, screws, rivets, or other conventional fastening means.

A third chamber 38 is formed between the third light transmissive sheet 36 and a concave, curvilinear light reflective material 40.

In the preferred embodiment, a series of concave ribs 42, span from the upper portion of the rear vertical support 8, to the forward portion of the horizontal base 6. These concave ribs 42 serve to maintain the position of the concave, curvilinear light-reflective material 40.

Insulating material 44, is located between the horizontal base 6, the rear vertical support 8, and the concave, curvilinear light reflective material 40.

Figure 8:
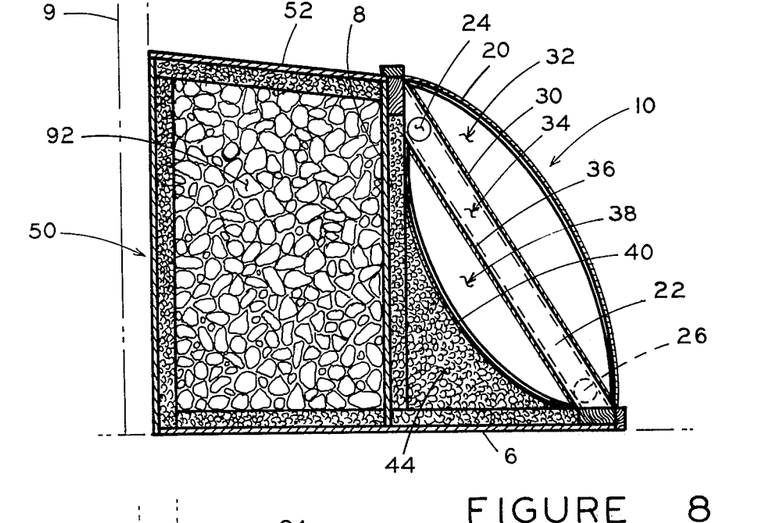
FIG. 8 is a cross sectional view of the solar collection system with the heat storage located behind the solar collection system.

The solar collection system 10, may be located directly adjacent to a new or existing building 9, to shorten ducting and conserve heat loss between the rear of the collector 8 and atmosphere.

Where the heat storage 50 is located in the ground, directly beneath the solar collector 10, as shown in FIG. 3, a low profile solar collector 10 is suitably located beneath windows, or for use with greenhouses, where available light is critical to growing plants.

Where below ground heat storage 50 is not desired, a low profile solar collector can be maintained as shown in FIG. 8, where the heat storage 50 is located directly behind the solar collector 10. In this configuration, the upper surface of the heat storage unit 52 may be inclined to shed water away from the heated structure.

Figure 9:
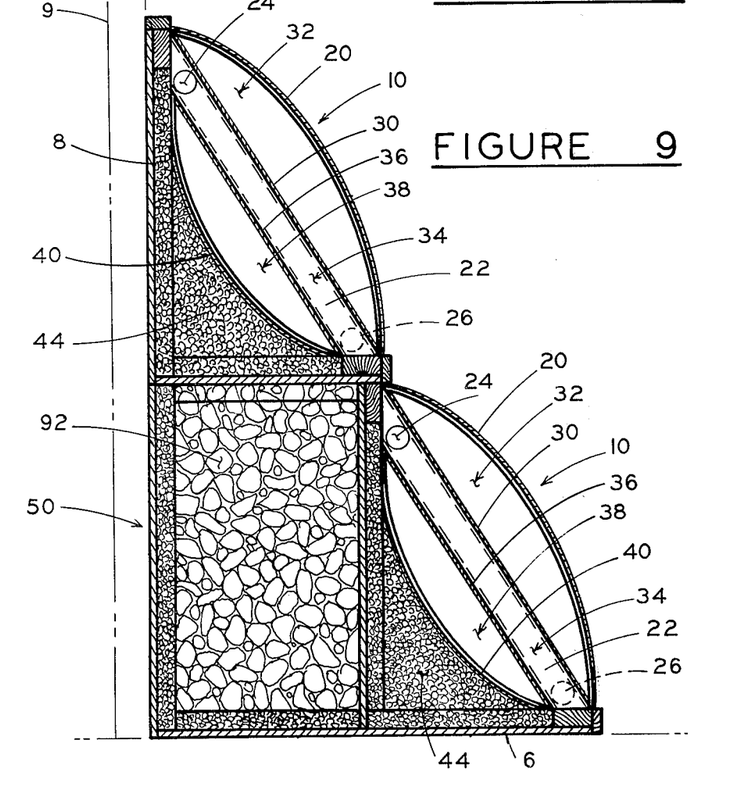
FIG. 9 is a cross sectional view of the solar collection system and heat storage wherein two solar collection systems are utilized with one heat storage system, one located directly above the heat storage system and the second solar system located directly in front of the heat storage system.

In applications where it is desirable to double the solar collection surface for increased heat convection, dual solar collection systems may be located in front of, and above the heat storage medium as shown in FIG. 9. In this configuration, the solar collection units provide increased insulation to the heat storage medium 50.

FIG. 3 shows an optional means for subassembly of the secondary chambers 34. Each end of the diagonal ducts is capped by ends 33,35. This provides a ready means to secure light-transmissive sheets 30,36 above and below the diagonal ducts 22, and also provides an excellent surface for mounting convex ribs 28 and concave ribs 42.

Horizontal base 6 and rear vertical support 8 may thus be preassembled and suitably braced. The concave, curvilinear surface 40, may then be secured to the forward portion of the horizontal base 6, and insulation 44 added between reflective material 40 and rear vertical support 8. Reflective material 40 can then be positioned in a concave, curvilinear shape, and secured to the upper portion of the rear vertical support 8.

The preassembled, diagonal ducts may then be positioned against the rear vertical support 8 and the horizontal base 6, and secured in place by conventional fastening means.

Once the diagonal ducts 22 are secured, the outer light transmissive material 20 is secured to the forward end of the horizontal base 6 with retaining bar 13, and stretched over convex ribs 28 and secured to the upper end of the rear vertical support 8 with retaining bar 15. The entire solar collecting unit 10 may then be hinged 80, as shown in FIG. 3. This provides access to heat storage 50 located beneath the solar collection unit 10.

Figure 10:
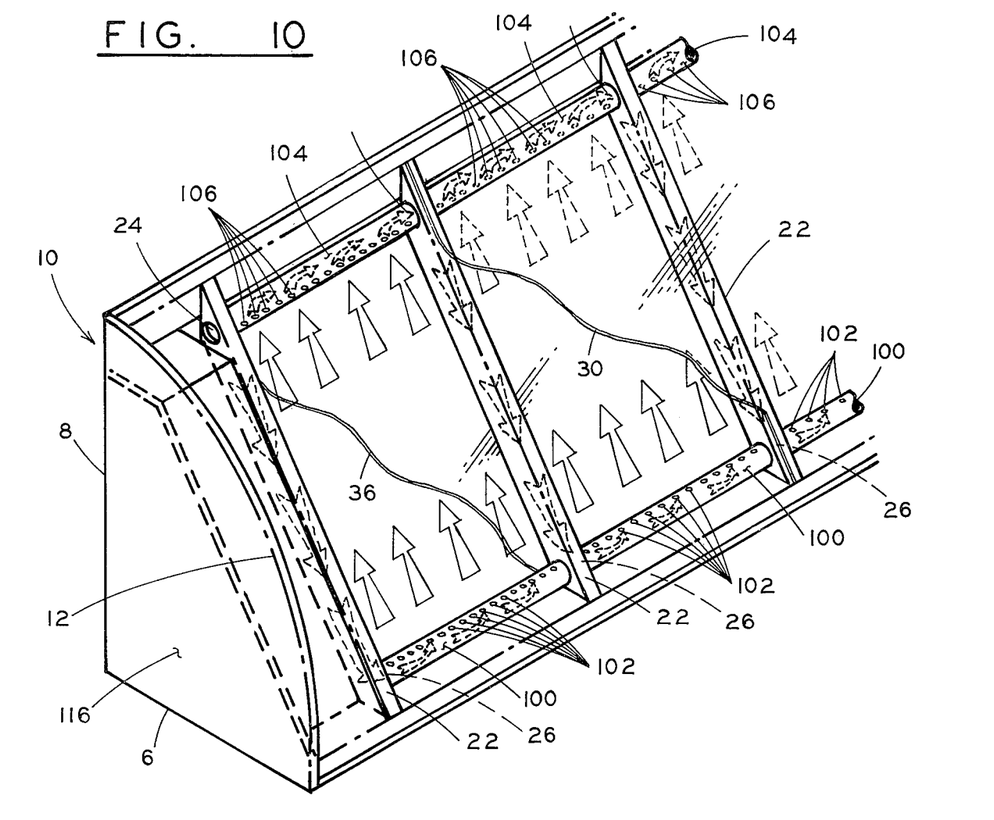
FIG. 10 is a perspective view of the second series of chambers, showing the use of perforated tubes to evenly distribute the air through the secondary chambers.

An optional means to uniformly direct the air through the secondary chambers is shown in FIG. 10. An elongated outlet tube 100 may be located to receive outlet air from diagonal ducts 22 through outlet opening 26. A plurality of holes 102, are then provided in the outlet tube to uniformly direct the incoming air through each secondary chamber 34.

An inlet tube 104 may also be provided with a plurality of holes 106 to receive heated air rising by natural convection and direct the heated air into the inlet opening 24 in the next succeeding diagonal duct 22.

When either inlet or outlet tubes are used, it is preferred that the total area of openings 102,106 be equal to or slightly greater than the area of the inlet opening 24 or outlet opening 26 of each diagonal duct. This serves to equally distribute the air throughout each series of secondary chambers 34 without creating a back pressure of air in the system.

HEAT STORAGE

Figure 11:
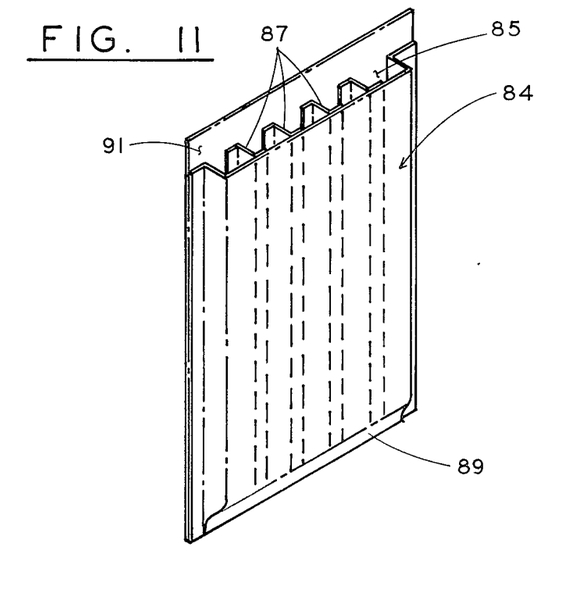
FIG. 11 is a perspective view of a modularized flexible bag for receiving particulate insulation, which forms a flexible insulation barrier capable of conforming to the uneven surface of an excavated hole.

When the heat storage 50 is located beneath the surface, as indicated in FIGS. 1,3, a hole 82 is excavated. This excavated hole need not be uniformly square, smooth, or level throughout its entire length. As shown in FIG. 11, insulating bags 84 are formed with two sheets of nonporous material which are sealed to form a bag in which partitions 87 serve to retain the general shape of the bags when particulate insulation 44 is used to fill openings 85.

End flap 91 is then used to seal the insulation 44 within the bag 84 for ease of handling.

The modularized insulating bags may then be placed along all surfaces exposed to the environment to protect against heat loss from the heat storage area 50.

In the preferred embodiment, insulating bags are made from plastic film material, and are heat sealed, glued or taped to retain insulation 44.

The partitioned compartments 84 serve to retain the general configuration of the insulating bags when filled with insulation.

Insulation bags 84 may be positioned side-by-side in an excavated hole, providing protection against heat loss, while providing drainage of liquids from the heat storage medium 92.

Insulation bags 84 may be prefabricated and shipped to the installation site, prior to filling with insulation. Insulation may be purchased in bulk form locally, saving costs of handling and transportation.

Insulation bags 84 may be filled and sealed at the assembly site and installed in hole 82. Vertical baffles 86,88, shown in FIG. 1, may be formed with insulating bags 84 as previously described.

The raised and lowered vertical baffles 86,88 serve to direct the heated air around and through the heat storage medium, maximizing the amount of heated air in contact with the heat storage medium 92 and eliminating dead spots in the system.

Where drainage is a problem, a sump pump (not shown) may be provided in the vicinity of the heat storage system to remove excess water.

With the use of conventional heat storage medium 92, such as crushed rock of an aggregate size of approximately one-half to two inches, no foundation is required. After excavation, insulating bags 84 are positioned at the base of the hole, and vertical insulating bags 84 are secured to the sides of the hole. Then, vertical baffles 86,88 are positioned and secured. The heat storage medium 92 may then be placed into the hole.

Once the heat storage system 50 has been installed, the solar collection system 10 can then be installed above the heat storage system.

Where excavation is a problem, the heat storage may be located directly behind the solar collection system, as shown in FIG. 8. Where height is not a problem, one solar collection system 10 can be mounted in front of the heat storage system 50, and a second solar collection system 10 can be mounted above the heat storage system 50. (See FIG. 9.)

In addition to rocks, salts have been shown to be an excellent heat storage medium. With this system, any available heat storage medium for heat convection and storage may be used.

FIG. 2 shows the routing of air through the solar collection and heat storage apparatus. Note that air from the point of use travels through the heat storage medium 92 in opposite directions 94,96 to air passing through the heat storage medium 92 from the solar collector 10. This is an important feature of the present invention. The hottest air entering the heat storage medium 92 from the solar collector 10 is cooled as the air passes in direction 96 through the heat storage medium. Therefore, the hottest portion of the heat storage medium is that portion closest to the end receiving hot air from the solar collector 10.

Conversely, when cycling air from the point of use through the heat storage medium 92, air flows in direction 94 from the point of use is heated as it passes through the heat storage medium, and exits to the point of use, warmer than when it entered the heat storage medium.

This invention takes into account these factors, and provides for the reversing of direction of air passing through the heat storage medium 92, so that heat storage convection may be optimized.

Reversing the flow of air also serves to purge air passageways in the heat storage medium 92 that tend to clog with particulate matter in single direction air flow systems. By systematically reversing the flow of air through the heat storage medium 92, maintenance to the heat storage medium is reduced and overall efficiency is improved.

HEAT TRANSFER

Figure 4:
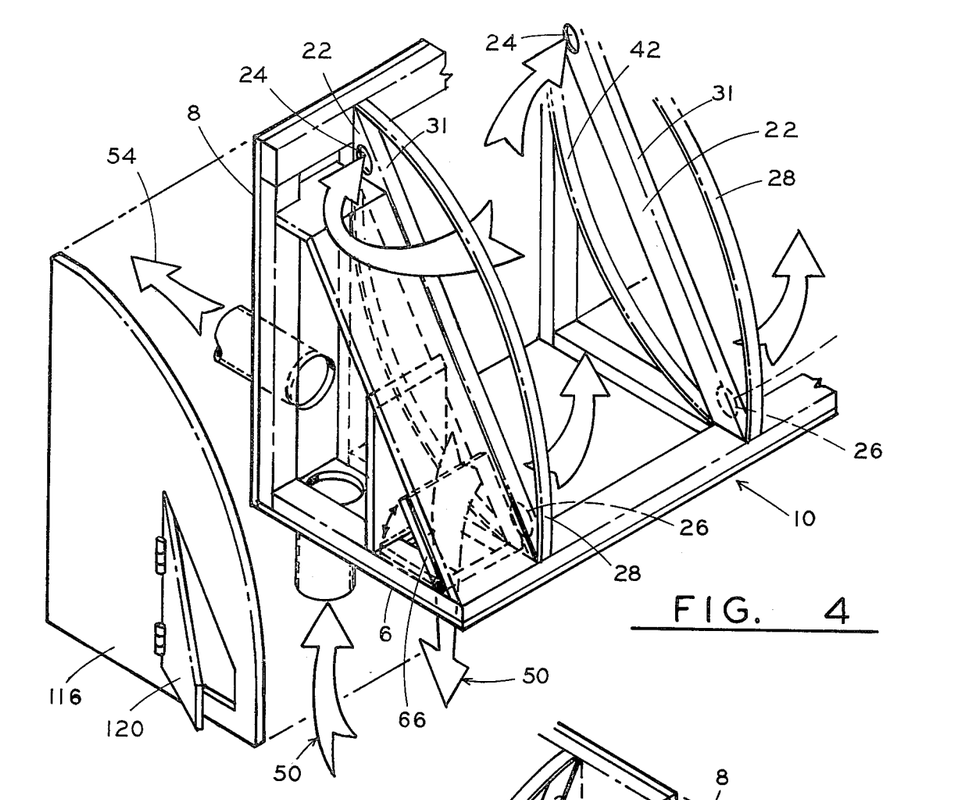
FIG. 4 is an exploded, isometric view of one end of the solar collection system showing the routing of air from one chamber to the next and to-and-from the heat storage.
Figure 5:
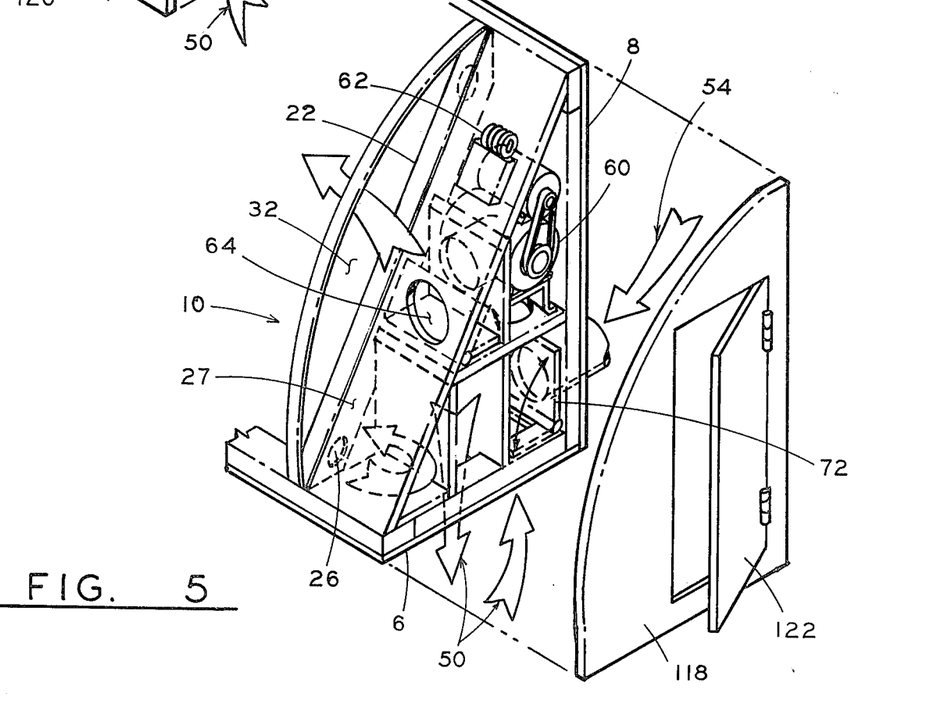
FIG. 5 is an exploded, isometric view of the opposite end of the solar collection system showing the routing of air from the point of use or heat storage, to the solar collector, or from the point of use through the blower to the heat storage.

FIGS. 4,5 show the ends of the solar collector 10 adapted to route air through the entire system. Inlet air is selectively routed from heat storage 50 or point of use 54 to air pump 60 by inlet gate valve 72. Inlet gate valve 72 is controlled by a temperture-responsive means 70, such as a thermostatic control switch, located at the point of use. Outlet air from the air pump 60 is selectively directed to the solar collector 10 or heat storage 50 by outlet gate valve 64. The outlet gate valve 64 is controlled by a temperature-responsive means 62 located within the solar collector 10.

Optional gate valve 66 opens when temperature-responsive means 62 is actuated, to allow air to pass freely through the solar collector 10, and closes when solar collector 10 is not operating, to conserve heat loss from heat storage 50.

Figure 6:
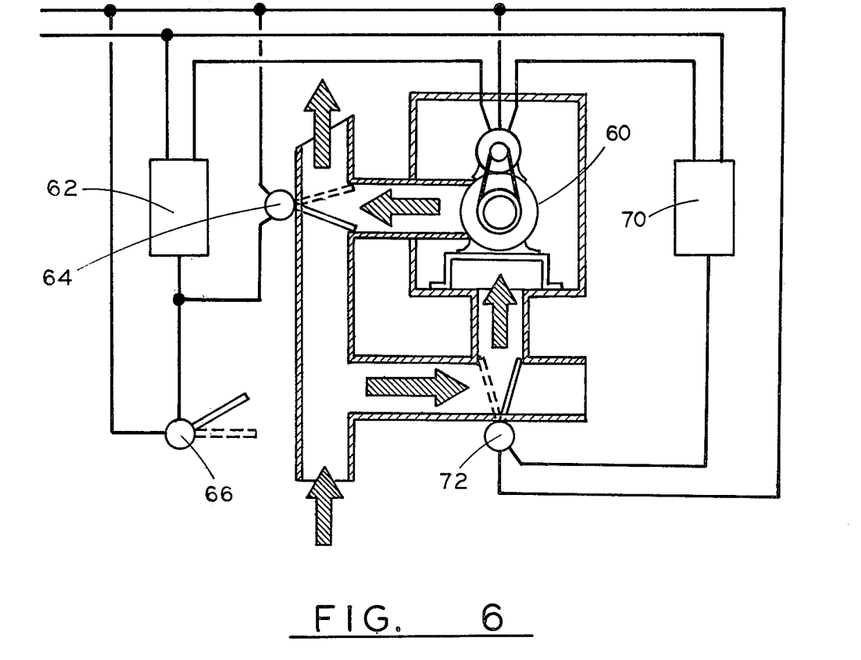
FIG. 6 is a schematic view of blower and associated duct system showing temperature-responsive means controlling gate valves which act to selectively direct the air from heat storage through the blower and to the solar collector.

As shown in FIG. 6, when temperature-responsive means 62 indicates there is sufficient heat in the solar collector 10, outlet gate valve 64 and optional gate valve 66 are positioned as shown in solid line, and air pump 60 is actuated.

Shaded arrows show passage of air from heat storage 50, past inlet gate valve 72, through air pump 60, past outlet gate valve 64, and into the solar collector 10.

Figure 7:
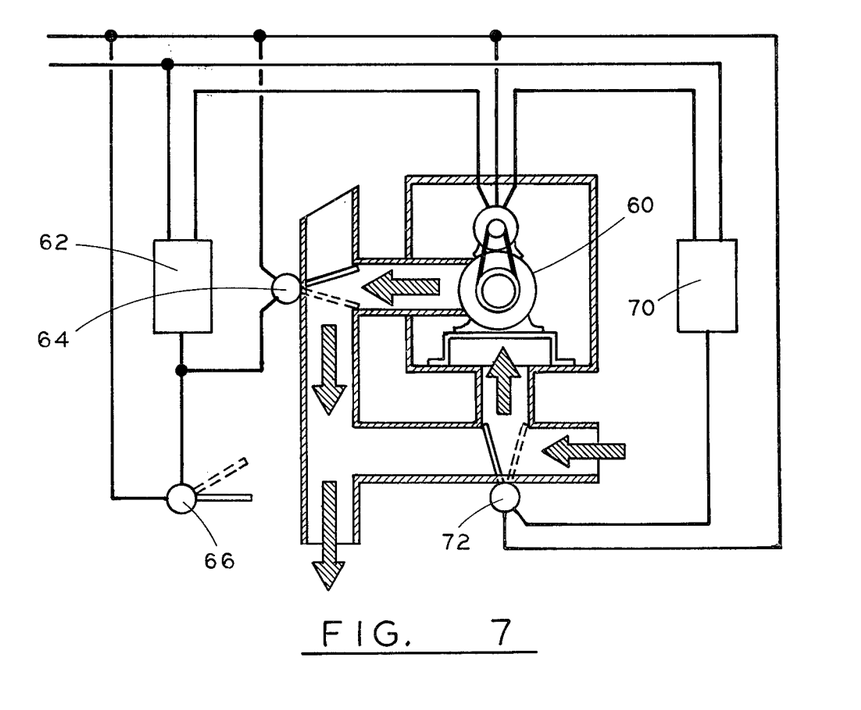
FIG. 7 is a schematic view of the blower and associated ductwork showing temperature-responsive means selectively positioning gate valves to direct the air from the point of use through the blower and into the heat storage system.

As shown in FIG. 7, when the temperature-responsive means 70 located at the point of use calls for heat, inlet gate valve 72 is positioned as shown in solid line, and air pump 60 is actuated. Shaded arrows show passage of air from the point of use, past inlet gate valve 72, through the air pump 60, past outlet gate valve 64, and into heat storage 50.

Should there be sufficient heat in the solar collector 10, when the temperature-responsive means 70 at the point of use 64 calls for heat, outlet gate valve 64 and optional gate valve 66 would move to dashed line position, allowing air to pass from the point of use, past inlet gate valve 72, through air pump 60, and past outlet gate valve 64 for circulation between the point of use and the solar collector 10, without routing air through the heat storage 50.

Thus, with one air pump 60 and two gate valves 64,72, this system selectively routes air from the solar collector 10 to the heat storage 50 and back to the solar collector 10; from the point of use 54 to heat storage 50 and back to the point of use 54; or, from the point of use 54, through the solar collector 10, and back to the point of use 54.

It is important to note that the relation of the air pump 60 to gate valve 64,72 makes possible the reversing direction of flow through the heat storage 50, as shown in FIG. 2.

FIGS. 2,4,5 show the routing of air between chambers within the solar collector 10. Access doors 120, 122 are provided in the ends of solar collector 10 for easy access to the air pump, gate valves, and other apparatus.

With this design, access to the rear of the solar collector is not required, making possible the positioning of this unit directly adjacent to a new or existing structure.

OPERATION OF THE INVENTION

When sunlight shines through the convex light transmissive material 20, heat builds up in the first chamber 32. Once the preselected minimum operating temperature is reached, temperature-responsive means 62 positions gate valves 64,66 as shown in solid line in FIG. 6, and actuates air pump 60.

Air is drawn from heat storage 50, through air pump 60, and into the first chamber 32 of the solar collector 10. The incoming air slowly travels the entire length of the first chamber 32, where it is heated by sunlight passing through the first chamber 32.

Air from chamber 1 enters inlet port 24, where the air rapidly passes down inclined duct 22 to escape through outlet port 26 into the first of a series of secondary chambers 34 located beneath the first chamber 32.

Air within each secondary chamber is again slowed down by the increased volume of space, and heated by sunlight passing through the series of second chambers 34. As the air within each secondary chamber is heated, the hottest air rises by natural convection, and passes through successive inlet ports 24, through ducts 22, past outlet ports 26 into successive secondary chambers 34.

Since only the hottest air from one secondary chamber 34 is routed to the next secondary chamber 34, the air is increasingly heated as it progresses through the series of secondary chambers.

For optimum efficiency, inlet and/or exhaust tubes with a plurality of openings are provided to uniformly direct the incoming and outgoing air in each secondary chamber, to avoid "jet streams" and "dead spots" and provide uniform air flow within each secondary chamber.

Air from the last secondary chamber 34 is directed through inlet port 24, down inclined duct 22 through outlet port 26, and into a third chamber 38. Heated air in the third chamber 38 slows down and passes the entire length of the third chamber beneath the series of secondary chambers, where it is additionally heated by sunlight passing through the first and second chambers.

The concave, curvilinear surface of the third chamber is made reflective, which redirects sunlight back through all three chambers, which additionally heats the air within each chamber.

Air from the third chamber is directed into the heat storage 50, at the end opposite the inlet air to the air pump 60. Thus, while the sunlight heats the solar collection unit 10, air is routed from the solar collector 10 to heat storage 50 and back to the opposite end of solar collector 10, for continued circulation. Heat is drawn from the passing air into the heat storage medium 92, as the heated air is circulated through heat storage 50.

When the temperature within the solar collector drops below the preselected operating temperature, the temperature-responsive means 62, positions gate valves 64,66 as shown in dashed line in FIG. 6, and deactuates air pump 60. When the temperature responsive means 70 located at the point of use reaches a preselected minimum operating temperature, inlet gate valve 72 is positioned as shown in solid line in FIG. 7, and air pump 60 is actuated.

Air is directed from the point of use 54 through air pump 60, and into heat storage 50. As air passes through the heat storage medium 92, it draws heat from the heat storage medium and returns to the point of use.

When there is insufficient heat in the heat storage medium to adequately heat the point of use, a secondary conventional heating system may be adapted to provide additional heat.

When there is sufficient heat in the solar collector, and the point of use requires heat, air from the point of use is routed directly through the solar collection apparatus to the point of use, without passing through heat storage 50.

The first chamber serves as a buffer zone between atmospheric temperature and the secondary chambers. The secondary chambers, in turn, serve as a buffer zone against heat loss from the third chamber. Insulation located behind the third chamber insures that heat captured from sunlight will not be lost by convection and vented back to atmosphere.

No attempt is made to store heat directly within the solar collection system with cans, fins, filings, etc., as occurs in most other systems. The principle here is the successive use of a series of air chambers through which air passes and is heated by the sun. This air is not only heated within each chamber by the "greenhouse effect", but the successive chambers 32,34,38 serve to buffer against heat loss to atmosphere.

The outer convex, curvilinear shape serves to capture a large portion of sunlight, regardless of the position of the sunlight in the sky.

The system is very forgiving. A leak will not incapacitate this system. Should electricity fail, there is no danger from freezing liquids.

The light-transmissive sheets may be inexpensively replaced every few years, as is common with many greenhouse coverings. Collector surfaces that attempt to provide a lifespan greater than several seasons, lose efficiency as the surface becomes scratched, soiled, or otherwise loses its ability to transmit light.

Rain, hail, and snow tend to fall uniformly from the sky. Where a flat plate collector is used, these externally falling objects tend to hit the flat plate collector at the same angle, increasing the effect of impact. With the use of a convex, curvilinear exterior shape, externally falling objects such as rain, hail, and snow, strike the curved surface at divergent angularity, which lessens the effect of impact. This is true, whether or not the solar collection system is operating.

This system can be positioned directly against an existing structure, eliminating loss of heat to atmosphere by a large, normally exposed rear surface. This acts to increase the overall efficiency of the system, since all controls and moving apparatus are located at the ends of the solar collector, there is no need to provide access to the rear of the system.

This solar collection system is readily adaptable to low profile configurations, such as would be required with greenhouse applications, or where windows would limit the desirable height of a solar collection system. It will also be found useful in farming applications, such as hog farrowing houses, chicken farming, dairy operations, grain drying, and other agricultural uses, where it is desired to collect and store heat from sunlight.

Although the present invention has been illustrated and described in connection with a few selected example embodiments, it will be understood that these are illustrative of the invention, and are by no means restrictive thereof. It is reasonably to be expected that those skilled in the art can make numerous revisions and adaptations of the invention, and it is intended that such revisions and adaptations will be included within the scope of the following claims:

What is claimed is:

1. An apparatus for pneumatically collecting and storing heat from sunlight, which comprises:
    (a) a horizontal base;
    (b) a vertical rear support;
    (c) a series of ducts extending diagonally from the upper portion of the vertical rear support to the forward portion of the horizontal base;
    (d) an inlet port located at one side near the top of each diagonal duct;
    (e) an outlet port located at the side opposite the inlet port near the base of each diagonal duct;
    (f) a first light-transmissive material adapted to form a convex curvilinear shape extending from near the top of the vertical rear support to the forward portion of the horizontal base, and positioned to receive sunlight;
    (g) a second light-transmissive material adapted to be secured to the upper portion of the series of diagonal ducts, forming a first chamber between the first and second light-transmissive materials;
    (h) a third light-transmissive material adapted to be secured to the lower portion of the diagonal ducts, forming a series of second chambers between the second and third light-transmissive materials and the diagonal ducts;
    (i) a light-reflective material adapted to form a concave curvilinear shape extending from near the top of the vertical rear support to near the forward portion of the horizontal base, beneath the diagonal ducts, forming a third chamber between the third light-transmissive sheet material and the concave light-reflective material;
    (j) heat storage means located in proximity to the solar heat collecting apparatus;
    (k) one end of the collecting apparatus adapted to route air from the first chamber into the second chambers, and to redirect air from the third chamber to the heat storage means or the point-of-use;
    (l) the opposite end of the apparatus adapted to route air from the second chambers to the third chamber, and to redirect air from the heat storage means or the point-of-use to the first chamber; and
    (m) control means to force air under pressure selectively between the heat storage means and the point-of-use or between the heat storage means and the solar collecting apparatus, on demand.

2. The apparatus as claimed in claim 1, wherein the means to force air under pressure comprises an electrically actuated pneumatic pump.

3. The apparatus as claimed in claim 1, wherein the inlet and outlet ports referenced in (d) and (e) each comprise: an area substantially equal to, or greater than, the internal cross-sectional area of one of the ducts.

4. The heat storage means as claimed in claim 1, which comprises: the use of insulating material which is granular or particulate in shape for adaptability to varied configurations; the use of modularized, flexible bags which have been partitioned to maintain their proximate shapes when filled with the insulating material; a container or excavation sized to receive the modularized insulating bags filled with insulation material along all sides of said container or excavation exposed to earth or atmosphere; a series of baffles formed by modularized bags filled with particulate insulation and placed across the width of the cavity or container which serve to direct air through the heat storage means above and below the baffles; and a quantity of heat storage medium filling the cavities between the insulating bags and baffles while allowing air under pressure to be forced through the particulate heat storage medium to transfer heat between the heat storage medium and the passing air.

5. The apparatus as claimed in claim 1, wherein: the forward portion of the horizonal base is adapted to be hinged so that access may be provided to the base of the apparatus when said apparatus is located directly adjacent to a new or existing structure.

6. The apparatus as claimed in claim 1, wherein the means to selectively route the air under pressure comprises a single pneumatic pump adapted to direct the flow of air from the heat storage means to the solar collecting apparatus on demand, and to reverse the flow of air through the heat storage means from the point of use on demand, to optimize heat transfer.

7. The apparatus as claimed in claim 1, wherein each outlet port is covered by tubing extending between successive ducts, said tubing having a plurality of holes of a combined area approximating the area of the covered port, said holes being distributed across the length of the tubing, and serving to uniformly direct the air passing through each duct into each succeeding second chamber, optimizing heat transfer from sunlight to circulating air.

8. The pneumatic solar collection system as claimed in claim 1, for marketing in kit form, which comprises:
    (a) light-transmissive material adaptable to forming a convex curvilinear surface;

(b) a series of ducts adaptable to be diagonally secured, which have been provided with an inlet port on one side near the upper end, and an outlet port on the opposite side near the opposite end;

(c) light-transmissive sheets adaptable to being secured above and below the series of diagonal ducts;

(d) a light-reflective material adaptable to forming a concave curvilinear surface;

(e) an air pump and associated inlet and outlet gate valves adapted to selectively route air under pressure between heat storage and point-of-use, between the solar collecting apparatus and heat storage, or from the point-of-use to the solar collecting apparatus, on demand; and (f) wherein the user may purchase standard construction materials, insulation, and heat storage medium locally, to assemble and install the system on location.

9. The apparatus as claimed in claim 1 wherein said control means to selectively route the air on demand includes the use of a first temperature-responsive means located within the solar heat collector, and a second temperature-responsive means located at the point-of-use.

10. The apparatus as claimed in claim 9, wherein said control means comprises a pneumatic pump and first and second gate valves; the first temperature-responsive means comprises a first electrically-controlled thermostatic switch located within the solar heat collector and adapted to actuate the pneumatic pump and open said first gate valve between the collector and heat storage means or point-of-use when the temperature within the solar collector reaches a first predetermined level; and said second temperature-responsive means comprises a second electrically controlled thermostatic switch located at the point-of-use and adapted to actuate the pneumatic pump and open said second gate valve between the point-of-use and the collector or heat storage means when the temperature at the point-of-use falls below a second predetermined level, whereby when said collector temperature is above said first predetermined level and said point-of-use temperature is below said second level, air flow will be between said collector and point-of-use, and when said collector temperature is below said first level and said point-of-use temperature is below said second level, the air flow will be between said heat storage means and said point-of-use, and when said collector temperature is above said first level and said point-of-use temperature is above said second level, the air flow will be between the collector and said heat storage means, and when said collector temperature is below said first level and said point-of-use temperature is above said second level, there will be no air flow.

11. The apparatus as claimed in claim 1, wherein the first chamber provides a vapor barrier reducing heat loss from the series of second chambers to atmosphere, and the second chambers serve as an additional vapor barrier for the third chamber, greatly reducing heat loss to atmosphere from the third chamber.

12. An apparatus as claimed in claim 1, wherein the convex, curvilinear shape of said first light-transmissive material is supported by a plurality of convex ribs secured beneath said first light-transmissive material.

13. An apparatus as claimed in claim 1, wherein the concave, curvilinear shape of the light-reflective material is supported by a plurality of concave ribs secured beneath the diagonal ducts.

14. A pneumatic solar heat collection apparatus comprising:

a first elongated chamber whose outer surface forms a first light-transmissive convex, curvilinear surface across the major portion of the solar collection apparatus, allowing sunlight to pass therethrough, and through which air is circulated under pressure from one end of the chamber to the opposite end;

a series of longitudinally spaced transversely oriented elongated ducts positioned beneath said first chamber, each duct having an air inlet at its upper end and an air outlet at its lower end;

a series of second chambers formed by second and third light-transmissive materials secured respectively above and below said series of ducts, said second chambers being defined by said second and third materials and successive ducts, with air being directed from said first chamber to said second chambers, with air in each second chamber entering from a bordering duct outlet, the air rising in each second chamber as it is heated by the solar energy whereupon the air enters the inlet of the next succeeding duct, which serves to redirect the air to the lower portion of the next succeeding chamber;

said ducts being substantially smaller in cross section transverse to air flow than cross section of said second chambers;

an elongated third chamber formed between said third light-transmissive sheet and a concave, curvilinear reflecting surface positioned in spaced relation below the second chambers and adapted to receive the circulating air from the last in the series of second chambers and redirect the heated air across the major portion of the length of the solar collection apparatus, where the air is additionally heated by sunlight passing therethrough; whereby the concave, curvilinear reflective surface forming the lower surface of the third chamber serves to redirect the solar energy back through said third, second, and first chambers to further heat the air passing therethrough.

15. The apparatus of claim 14 wherein said ducts are diagonally inclined to the horizontal; and said duct inlet ports being located on one duct side facing the respective second chamber and said duct outlet ports being located on the opposite duct side facing the next successive second chamber.

16. The apparatus for collection of heat from sunlight as claimed in claim 15, which comprises:

(a) a first solar collector system positioned to receive sunlight;

(b) a heat storage means located directly behind the first solar collector system;

(c) a second solar collector system positioned above the heat storage means, and also positioned to receive sunlight; and (d) a means to force air under pressure selectively between the heat storage means and the solar collector systems; or between the heat storage means and the point-of-use.

* * * * *